United States Patent
Vishkin et al.

(10) Patent No.: US 6,768,336 B2
(45) Date of Patent: Jul. 27, 2004

(54) CIRCUIT ARCHITECTURE FOR REDUCED-SYNCHRONY ON-CHIP INTERCONNECT

(75) Inventors: Uzi Y. Vishkin, Rockville, MD (US); Joseph F. Nuzman, Aberdeen, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 10/166,008

(22) Filed: Jun. 11, 2002

(65) Prior Publication Data

US 2002/0186046 A1 Dec. 12, 2002

Related U.S. Application Data

(60) Provisional application No. 60/297,248, filed on Jun. 12, 2001.

(51) Int. Cl.[7] .................. H03K 19/173; H03K 19/00
(52) U.S. Cl. .................. 326/38; 326/47; 326/93; 327/141
(58) Field of Search .................. 326/38, 41, 47, 326/101, 93; 327/141; 713/400

(56) References Cited

U.S. PATENT DOCUMENTS

| | | | |
|---|---|---|---|
| 4,949,084 A | | 8/1990 | Schwartz et al. ...... 340/825.83 |
| 5,175,824 A | * | 12/1992 | Soderbery et al. ........ 710/317 |
| 5,400,262 A | | 3/1995 | Mohsen et al. ............ 364/489 |
| 6,204,686 B1 | * | 3/2001 | Agrawal et al. ............ 326/39 |
| 6,370,140 B1 | * | 4/2002 | Nayak ........................ 370/386 |
| 6,370,600 B1 | * | 4/2002 | Hughes et al. .............. 710/29 |

FOREIGN PATENT DOCUMENTS

WO    WO98/43193    1/1998

OTHER PUBLICATIONS

Alverson, R. et al. "The Tera Computer System," Int. Conf. on Supercomp., 1—6, (1990).
Chang, K.Y.K. et al. "A 50 Gb/s CMOS Crossbar Chip Using Assymetric Serial Links," www.mos.stanford.edu/papers/kc_vlsi_99.pdf, (1999).
Montanaro, J. et al., "A 160–MHz 32–b 0.5W CMOS RISC Microprocessor," IEEE Journal of Solid–State Circuits, vol. 31, No. 11, Nov. 1996, p. 1704.
Naishlos, D. et al., "Evaluating Multi–Threading In The Prototype XMT Environment," In Proc. 4th Workshop on Multi–Threaded Execution, Architecture and Compilation (MTEAC2000), Dec. 2000 (held in conjunction with the 33rd Int. Symp. on Microarchitecture MICRO–33), http://www.umiacs.umd.edu/users/~vishkin/XMT/mteac4.pdf.
Sutherland, I.E., "Micropipelines," Communications of the ACM 32:720–738 (1989).
Tullsen, D.M. et al. "Simultaneous Multithreading: Maximizing On–Chip Parallelism," In Proc. 22nd ISCA (1995).
Vishkin, U. et al., Explicit Multi–Threading (XMT) Bridging Models for Instruction Parallelism (Extended Abstract). In *Proc. 10th ACM Symposium on Parallel Algorithms and Architectures (SPAA)* 1998.
Vishkin, U., "A No–Busy–Wait balanced tree parallel algorithmic paradigm." In *Proc. 12th ACM Symposium on Parallel Algorithms and Architectures (SPAA)*, 2000.
Vishkin, U. et al., Explicit Multi–Threading (XMT) Bridging Models for Instruction Parallelism (Extended Summary & Working Document (1998); http://www.umiacs.umd.edu/users/~vishkin/XMT/bsp–like.ps.

\* cited by examiner

Primary Examiner—James H. Cho
(74) Attorney, Agent, or Firm—Liniak, Berenato & White

(57) ABSTRACT

The invention relates to an interconnect, and to interconnect architecture, for communicating between processing elements and memory modules in a computer system comprising on-chip parallel computation, in order to reduce the tight synchrony that is required by important components of most present computers.

15 Claims, 2 Drawing Sheets

CIRCUIT ARCHITECTURE FOR REDUCED-SYNCHRONY ON-CHIP INTERCONNECT

CROSS-REFERENCE TO RELATED APPLICATIONS

This application claims priority to U.S. Patent Application Serial No. 60/297,248, filed Jun. 12, 2001, herein incorporated by reference in its entirety.

FIELD OF THE INVENTION

The invention relates to an interconnect, and to interconnect architecture, for communicating between processing elements and memory modules in a computer system comprising on-chip parallel computation, in order to reduce the tight synchrony that is required by important components of most present computers.

BACKGROUND OF THE INVENTION

The processing architecture employed by today's personal computers is based on the von-Neuman architecture developed in the late 1940s (Hennessy, J. L. et al., "Computer Architecture: A Qualitative Approach," $2^{nd}$ Edition 1996 (Morgan Kaufmann Publ., San Francisco, Calif.). Originally, the architecture presumed that processing follows a set of sequentially executed instructions, without any concurrent operations. While architecture implementation based on such a presumption had been effective in the past, the number of transistors on an integrated circuit (chip) continues to double every 1–2 years, and will eventually outstrip the resources provided by the von-Neuman architecture. For this reason, instruction-level parallelism (ILP) architecture implementations are being developed that permit "pipelining"—the execution of instructions in stages such that different instructions may be at different stages of processing at the same time, or "multiple-issue"—the issuance of multiple instructions at the same time.

A further advancement has involved the use of multiple "execution" threads. Such threads are sets instructions, controlled by several program counters, which operate concurrently (R. Alverson et al. "The Tera Computer System," Int. Conf. on Supercomp., 1–6, (1990); D. M. Tullsen et al. "Simultaneous Multithreading: Maximizing On-Chip Parallelism," In Proc. 22nd ISCA (1995).

Pipeline designs store and process data as they passes along pipeline stages. They can be clock driven or event driven depending upon whether their parts act in response to an external clock, or act independently in response to local events. Pipeline throughput can be either inelastic (i.e., input rate fixed) or dynamic (i.e., input rate may vary). The separate pipeline stages are capable of concurrent operation. Thus, pipelining provides high speed and are a common paradigm for very high speed computing machinery (Sutherland, I. E., "Micropipelines," Communications of the ACM 32:720–738 (1989), herein incorporated by reference). With very few exceptions—a handful of research and small commercial systems, most present day computers are synchronous machines or systems. In such machines or systems, instructions and data move from one pipeline stage to the next under the control of a single (global) clock.

A standard on-chip interconnect is the self routing synchronous crossbar (see, U.S. Pat. No. 4,949,084 (Schwartz, R.); U.S. Pat. No. 5,400,262 (Mohsen; A. M. et al.). Several factors make the synchronous crossbar a less than ideal solution. One problem is that orchestrating unpredictable access among the various ports (processing elements and memory modules) adds unnecessary overhead to the system. Traditional on-chip solutions require some sort of global coordination to set a particular configuration. Ideally, messages would freely access their destinations, with contention dealt with locally only where it occurs.

It is well documented that wire delay will become an increasingly important factor in future chip design. As process dimensions shrink, clock speed improves while relative wire resistance increases. The foundations of present systems were conceived 10–15 years ago when 1.6-micron technologies allowed interconnect delays to be ignored. These systems thus were focused on optimizing for gate delay only. In today's deep submicron silicon, however, wire interconnect delay can represent as much as 80% of the path delay (http://www.magma-da.com/c/@gcLWtfuirkG0Q/Pages/fixedtiming.html#Managing). The reason for the delay shift is technological.

To reach high operating frequencies, a design that involves short, low-capacitance wires is required. A crossbar design with high connectivity is, however, a large structure. Modulating signals on a long wire across such a structure at speeds near that at which the active devices are capable of operation becomes infeasible.

Furthermore, clock distribution across a large chip also becomes more difficult. At high frequency, stable clock distribution is an increasingly difficult design problem. The International Technology Roadmap for Semiconductors projects a growing disparity between clock speeds that can be achieved locally and those that can be achieved across a chip. Additionally, high performance clocking trees with large drivers consume a large amount of power. In contemporary Alpha processor designs, the clock tree consumes 50% of the processor power (J. Montanaro et al., "A 160-MHz 32-b 0.5W CMOS RISC Microprocessor," IEEE Journal of Solid-State Circuits, volume 31, number 11, November 1996, p. 1704, In sum, with very few exceptions—a handful of research and small commercial systems—most present day computers are synchronous machines or systems. In such machines or systems, instructions and data move from one pipeline stage to the next under the control of a single (global) clock. The present invention seeks to reduce the tight synchrony required in some important computer components. The present invention relates to a form of pipeline architecture implementation whose interconnects permit high-speed communication between processing elements and memory modules thereby reducing the need for tight synchrony. The invention provides an approach which advocates increasing greatly the number of threads and program counters.

SUMMARY OF THE INVENTION

An object of the invention is to provide a method and interconnect device, or a part of such device, for interconnecting processing elements and memory modules in a computer system comprising on-chip parallel computation such that the elements and modules can communicate with one another with increased efficiency.

In detail, the invention provides a semiconductor integrated circuit device comprising an interconnect structure for electrically processing data from at least one of a plurality of input ports to at least one of a plurality of output ports on or within a semiconductor substrate having contact areas disposed in a predetermined spaced relation, the interconnect structure comprising input port leads, multiplexors, and output port leads, wherein the multiplexors perform switching decisions and the input leads from each of the input ports are co-located.

The invention additionally provides a digital device on or within a semiconductor chip, which comprises:

(A) a plurality of storage cells for storing digital signals therein;

(B) a plurality of functional cells for performing functional operations on digital signals; and (C) an interconnect matrix having a plurality of multibit input leads from at least one of a plurality of input ports connected to receive multibit inputs from one or more of the storage or functional cells, and having a plurality of multibit output leads to at least one of a plurality of output ports connected to send signals to one or more other of the storage or functional cells, wherein the interconnect matrix further includes at least one pair of multiplexors that functions to coordinately process the multibit inputs from an input port.

The invention additionally provides a computer circuit which comprises a semiconductor integrated circuit device including an interconnect structure for electrically processing data from at least one of a plurality of input ports to at least one of a plurality of output ports in a semiconductor substrate having contact areas disposed in a predetermined spaced relation, the interconnect structure comprising input port leads, multiplexors, and output port leads, wherein the multiplexors perform switching decisions and the input leads from each of the input ports are co-located.

The invention additionally provides a computer circuit which comprises a digital device comprised of:

(A) a plurality of storage cells for storing digital signals therein;

(B) a plurality of functional cells for performing functional operations on digital signals; and (C) an interconnect matrix having a plurality of multibit input leads from at least one of a plurality of input ports connected to receive multibit inputs from one or more of the storage or functional cells, and having a plurality of multibit output leads to at least one of a plurality of output ports connected to send signals to one or more other of the storage or functional cells, wherein the interconnect-matrix further includes at least one pair of multiplexors that functions to coordinately process the multibit inputs from an input port.

The invention additionally provides a computer system comprising two or more computers in communication with one another which comprises a semiconductor integrated circuit device comprising an interconnect structure for electrically processing data from at least one of a plurality of input ports to at least one of a plurality of output ports on or within a semiconductor substrate having contact areas disposed in a predetermined spaced relation, the interconnect structure comprising input port leads, multiplexors, and output port leads, wherein the multiplexors perform switching decisions and the input leads from each of the input ports are co-located.

The invention additionally provides a computer system comprising two or more computers in communication with one another which comprises a digital device comprised of:

(A) a plurality of storage cells for storing digital signals therein;

(B) a plurality of functional cells for performing functional operations on digital signals; and (C) an interconnect matrix having a plurality of multibit input leads from at least one of a plurality of input ports connected to receive multibit inputs from one or more of the storage or functional cells, and having a plurality of multibit output leads to at least one of a plurality of output ports connected to send signals to one or more other of the storage or functional cells, wherein the interconnect matrix further includes at least one pair of multiplexors, each of which functions to coordinately process the multibit inputs of two input ports.

The invention additionally provides embodiments of such semiconductor integrated circuit device, digital device, computer circuit, and computer system wherein the interconnect structure is configured such that the switching decisions can be made locally, and/or wherein the data progresses dynamically through the multiplexors as soon as they are able to do so, and/or wherein the interconnect structure is highly pipelined, and/or wherein the device operates asynchronously and/or without global coordination.

The invention additionally provides embodiments of such semiconductor integrated circuit device, digital device, computer circuit, and computer system which comprises the architecture of input ports, output ports and multiplexors shown in FIG. 2.

DESCRIPTION OF THE PREFERRED EMBODIMENTS

The invention relates to an interconnect, and to interconnect architecture, for communicating between processing elements and memory modules in a parallel on-chip computer system.

As used herein, the term "interconnect" refers to a circuit element capable of processing and/or storing data in accordance with switching decisions, and of routing data from an input lead to an output lead. The term "switching decision" refers to criterion upon which data is evaluated to determine its routing through the interconnect. Switching decisions may be made by a "computer-facilitated protocol" (i.e., a decisional process that employs software and/or hardware devices and that involve data exchange, analysis and/or processing), and, in particular, by circuit architecture (e.g., the placement and orientation of leads, wires, semiconductor devices, etc.). The term "computer system," as used herein is intended to encompass not only mainframe or base computer systems, but to generally include any device (e.g., personal computers, data processors, switching systems, telephones, fax machines, personal digital assistants (PDAs), 2-way radios, etc.) that is capable of processing and/or storing data.

The term "chip" as used herein denotes an integrated circuit chip, which comprises cells and connections between the cells formed on or within a semiconductor substrate. The chip may include a large number of cells and require complex connections between the cells. The term "cells" denotes a group of one or more circuit elements such as transistors, capacitors, and other basic circuit elements grouped to perform a function. Each of the cells of a chip may have one or more pins, each of which, in turn, may be connected to one or more other pins of the chip.

In particular, the interconnects of the present invention provide a workable solution to the above-mentioned problems that preferably possesses the following characteristics:

1. The interconnects are configured such that switching decisions can be made locally thereby permitting messages to progress dynamically as soon as they are able to do so.
2. The network of interconnects are highly pipelined, thereby enabling short wires and high throughput.
3. The design of the interconnects incorporates asynchrony, since driving a large, pipelined system at high clock speeds becomes increasingly impractical as its size increases.
4. While additional hardware and software to handle severely unbalanced communication loads may be needed, global coordination of the interconnect is typically unnecessary.

Figure 2:
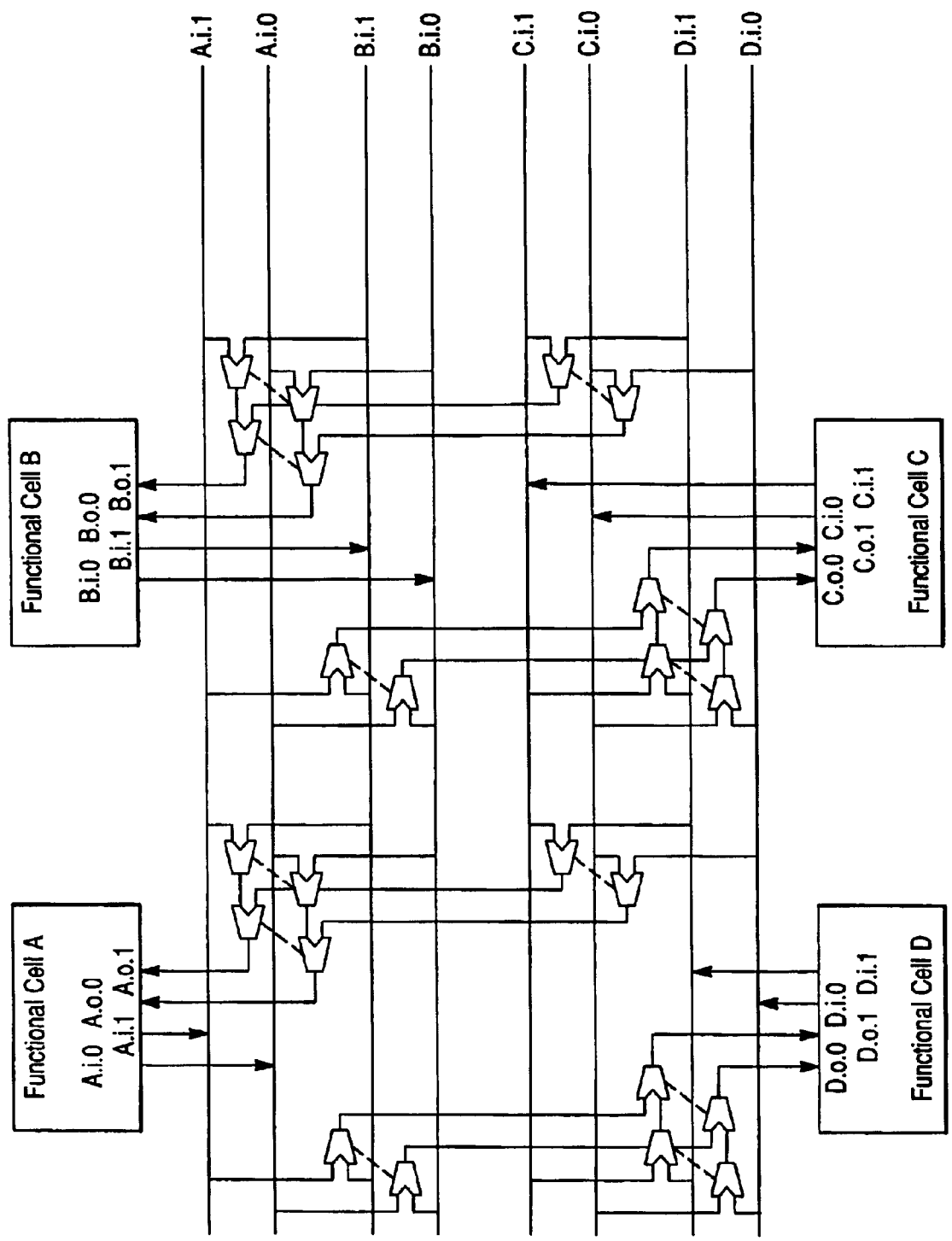
FIG. 2 illustrates a preferred embodiment of the design of the interconnects of the present invention with respect to an exemplary 2-bit interconnect.

In a preferred embodiment for implementing the interconnects of the present invention possessing such characteristics, most, and preferably, all, of the wires that will make the same routing decisions will be co-located. As illustrated in FIG. 2, (with respect to a 2-bit interconnect, for ease of illustration) the plurality of bits from a given port will be located adjacently to one another. In a preferred embodiment, pairs of multiplexors ("muxs") are coupled as a single logical "mux-pair," thereby enabling switching decisions to be made at the switch points so that messages can progress through a switchpoint as soon as they arrive. In a further preferred embodiment, the multibits from a given port will be "coordinately processed," for example, by some finite state machine. As used herein, the term "coordinately processed" is intended to refer to processing in which a mux pair evaluates the multibits from one port against the multibits of a second port. By way of contrast, in a non-coordinately processed architecture each single bit is evaluated against the corresponding single bit of a different port.

The "interconnects" of the present invention are illustrated with reference to Explicit Multi-Threading (XMT) processing (Vishkin, U. et al., "Explicit Multi-Threading (XMT) Bridging Models for Instruction Parallelism (Extended Summary & Working Document (1998); http://www.umiacs.umd.edu/users/~vishkin/XMT/bsp-like.ps); U. Vishkin et al., Explicit Multi-Threading (XMT) Bridging Models for Instruction Parallelism (Extended Abstract). In *Proc. 10th ACM Symposium on Parallel Algorithms and Architectures (SPAA)* 1998; U. Vishkin. "A No-Busy-Wait balanced tree parallel algorithmic paradigm." In *Proc. 12th ACM Symposium on Parallel Algorithms and Architectures (SPAA)*, 2000; D. Naishlos, et al., "Evaluating multi-threading in the prototype XMT environment. In *Proc. 4th Workshop on Multi-Threaded Execution, Architecture and Compilation (MTEAC*2000), December 2000 (held in conjunction with the 33rd Int. Symp. on Microarchitecture MICRO-33), all at http://vww.umiacs.umd.edu/~vishkin/XMT; all such references herein incorporated by reference).

XMT is a framework for parallel computing that provides a high-level parallel programming language and encompasses efficient implementation down to a parallel on-chip microprocessor architecture. Such on-chip architecture has the potential to scale to a high degree of parallelism. Use of the XMT framework requires an interconnect device capable of providing efficient communication between the parallel processing units and shared memories. The most distinguishing feature about the XMT framework is that it envisions an extension to a standard instruction set which aspires to efficiently implement Parallel Random Access Model (PRAM)-like algorithms; XMT does so by Single-Program-Multiple Data (SPMD) explicit multi-threaded instruction-level parallelism (ILP). The (virtual) thread structure of PRAM-like algorithms is very dynamic: the number of threads that need to be generated changes frequently, new threads are generated and terminated frequently, and often threads are relatively short.

XMT frameworks that can be used in accordance with the interconnects of the present invention are described in PCT Application Serial No. WO/US98/05975, and U.S. patent application Ser. No. 09/224,104, and in Naishlos, D. et al., "Evaluating Multi-threading in the Prototype XMT Environment," http://www.umiacs.umd.edu/users/~vishkin/XMT/mteac4.df); and Naishlos, D. et al., "Evaluating multi-threading in the prototype XMT environment," In Proc. 4th Workshop on Multi-Threaded Execution, Architecture and Compilation (MTEAC2000), December 2000 (held in conjunction with the 33rd Int. Symp. on Microarchitecture MICRO-33), all herein incorporated by reference.

The XMT high-level programming language provides a multi-threaded model that attempts to mimic "no-busy-wait" finite state machines. In such machines, no (software) thread ever needs to suspend its progress in order to wait for another thread. Execution involves a plurality of (software) threads that follow Independence of Order Semantics (IOS); that is, different speeds of execution among threads as well as an ability to tolerate different orders of executions of some reads and writes to memory locations. Thus, an attribute of XMT is that threads need to synchronize relatively infrequently. This attribute provides an opportunity for reduced-synchrony hardware implementation, and provides an opportunity for the novel technological solution of the present invention. XMT frameworks that can be used in accordance with the present invention are described in PCT Application Serial No. WO/US98/05975, and U.S. patent application Ser. No. 09/224,104, both herein incorporated by reference.

Figure 1:
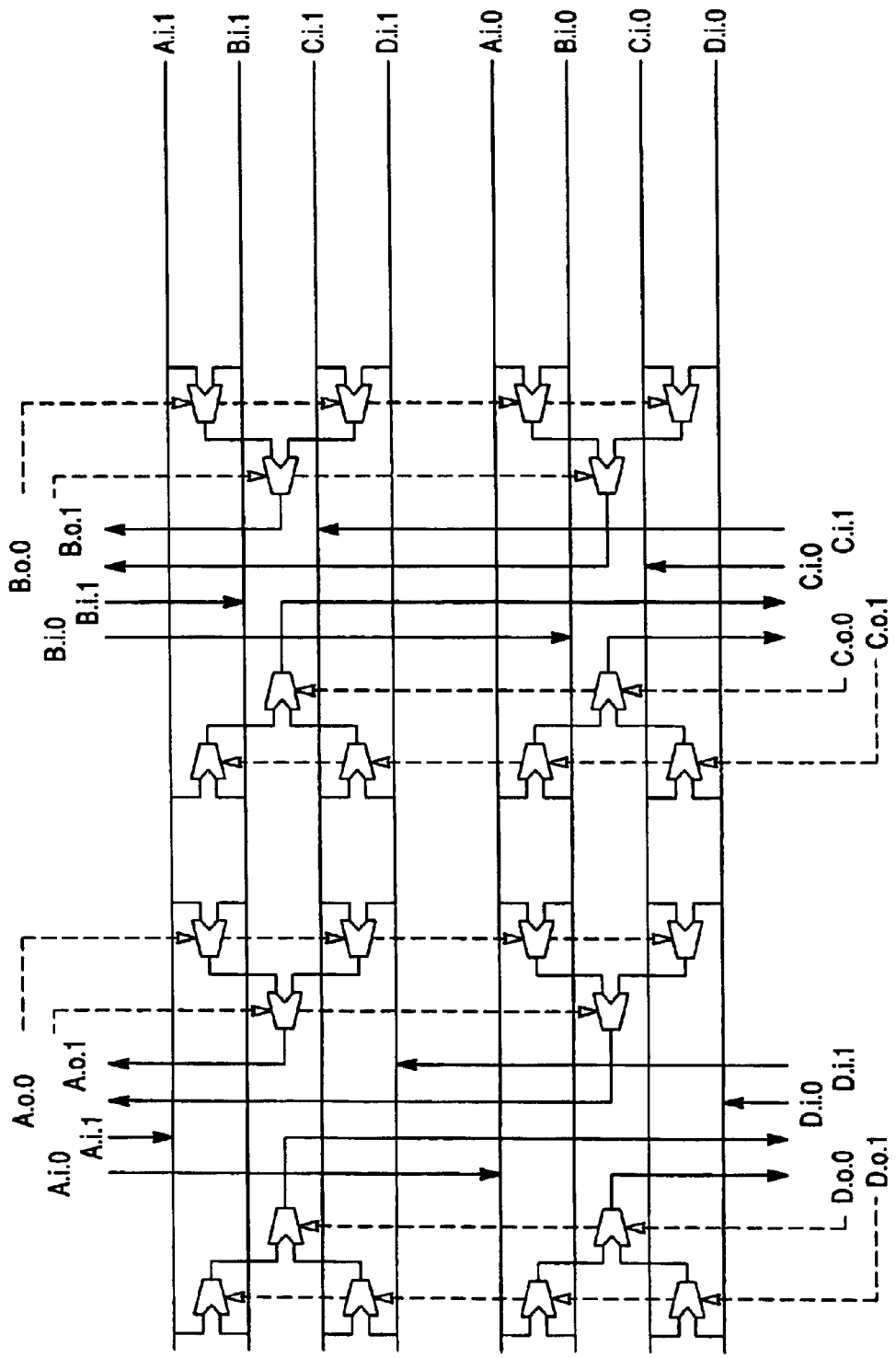
FIG. 1 represents a conventional interconnect design.

FIG. 1 and FIG. 2 illustrate the difference in datapath layout of the preferred embodiment of the invention. FIG. 1 represents a more conventional interconnect design; FIG. 2 illustrates a preferred embodiment of the design of the interconnects of the present invention with respect to an exemplary 2-bit interconnect. As will be appreciated, larger bit interconnects (e.g., 8-bit, 16-bit, 32, bit, 64-bit, 128 bit, etc.) may be likewise employed by extension of the design shown in FIG. 2. Both Figures illustrate the datapath layout of an interconnect between four ports (A, B, C, and D). Each port has a 2-bit input port (e.g., A.i.0 and A.i.1) going into the interconnect and a 2-bit output port coming out of the interconnect (e.g., A.0.0 and A.0.1). The trapezoidal boxes are muxs at which switching decisions are made as to which of two or more input(s) is/are to be passed along.

The layout in FIG. 1 can be described as a series of bit slices stacked one on top of another. In FIG. 2, the 2 bits from a given port are "bundled" together and follow the same global route throughout. The dashed lines in FIG. 2 connect pairs of muxs that are coupled as a single logical 2-bit mux ("mux-pair"). This new configuration enables a scheme in which switching decisions are made at the switch points. Messages are allowed to progress through a switchpoint as soon as they arrive. To achieve this goal, asynchronous control techniques are preferably employed. Each node of the mux-tree buffers a single data bundle. At each mux-pair, two data bundles compete to progress toward the root of the tree. An arbiter primitive (Sutherland, I. E., "Micropipelines," Communications of the ACM 32:720–738 (1989)) guards access to the buffer associated with the mux. The first of the two data bundles to arrive will win and be latched into the data buffer. If a second bundle arrives before the first clears the mux, then the second will be granted next access. Optionally, this switching automaton could be designed to incorporate alternation between inputs when both are continually attempting access. When applied globally, an alternation policy can prevent starvation.

By abandoning scheduled switching in favor of a more dynamic scheme, a new consideration is introduced. A data bundle written into the interconnect potentially can go to any of the destinations (e.g., the 4 possibilities depicted in the Figures) For demonstration purpose only simple bus connections are shown for connecting each source to the leaves of the mux trees of each destination. If the data is initially labeled with the intended destination, a leaf from each mux-tree can interpret the label to determine if it should enter that particular mux-tree. The label can be discarded at that point.

Similarly, when data is received at an output port; the source of the data must be determined. Each mux-pair can encode the local decision made and pass this data on toward the root of the tree. The receiver can determine the sender from this information.

If desired, asynchronous design can also be applied to pipelining the wires in the form of micropipelining (Sutherland, I. E., "Micropipelines," Communications of the ACM 32:720–738 (1989)). Long wires are highly pipelined to form independently latched short wires. Each bundle of wires (e.g., the 2-bit bundles in the Figures) requires 2 control wires to handshake between stages. Data can proceed from one stage to the next when the next stage has cleared.

The interconnects of the present invention can potentially overcome the limitations of the synchronous crossbar described above. The locally determined switching avoids global communication and coordination, while enabling efficient utilization of connectivity. The high degree of pipelining enables high bandwidth by allowing many data bundles in flight at once. In addition, long wires are avoided, thereby speeding stage-to-stage transfers and reducing driver size. Furthermore, an asynchronous global interconnect allows for all processing elements to be independently clocked. This eliminates the need for a global clock tree and allows processing elements to be clocked as fast as is locally possible.

While the Figures show only a limited number of ports, those of ordinary skill will recognize, in light of the above description, that the invention is readily adaptable to the inclusion of a larger number of ports and/or a larger number of bits per input port.

In a preferred embodiment, the memory architecture of the interconnects of the present invention will include parallel memories (i.e., a partition of the memory) so as to permit the system to achieve a digital signal processing (DSP)-like rate (for a general purpose processor) for streaming data in and out of the chip. By providing a strong on-chip interconnect, the invention permits one to use each of the pins connecting the chip to the outside (or clusters of such pins), for a separate memory connection. Thus, all of the pins can function in parallel. One can rely upon the high bandwidth of the interconnect to "mix and match" information once all of the relevant information is on-chip.

All publications and patent applications mentioned in this specification are herein incorporated by reference to the same extent as if each individual publication or patent application had been specifically and individually indicated to be incorporated by reference. The discussion of the background to the invention herein is included to explain the context of the invention. Such explanation is not an admission that any of the material referred to was published, known, or part of the prior art or common general knowledge anywhere in the world as of the priority date of any of the aspects listed above. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A semiconductor integrated circuit device comprising an interconnect structure for electrically processing data from at least one of a plurality of input ports to at least one of a plurality of output ports on or within a semiconductor substrate having contact areas disposed in a predetermined spaced relation, said interconnect structure comprising input port leads, multiplexors, and output port leads, wherein said multiplexors coordinately process multibit inputs from an input port and wherein said input port leads from each of said input ports are co-located within said interconnect structure.

2. The semiconductor integrated circuit device of claim 1, wherein said interconnect structure is configured such that switching decisions can be made locally.

3. The semiconductor integrated circuit device of claim 2, wherein said data progresses dynamically through said multiplexors as soon as said multiplexors are able to do so.

4. The semiconductor integrated circuit device of claim 1, wherein said interconnect structure is highly pipelined.

5. The semiconductor integrated circuit device of claim 1, wherein said semiconductor integrated circuit device operates asynchronously.

6. The semiconductor integrated circuit device of claim 1, wherein said semiconductor integrated circuit device operates without global coordination.

7. The semiconductor integrated circuit device of claim 1, wherein said interconnect structure comprises electrically processing data from a one input port.

8. The semiconductor integrated circuit device of claim 1, wherein said interconnect structure electrically processes said data from at least one of said plurality of input ports to one output port of said semiconductor substrate.

9. The semiconductor integrated circuit device of claim 1, wherein said interconnect structure electrically processes said data from one of said input ports to said one output port of said semiconductor substrate.

10. The semiconductor integrated circuit device of claim 1, wherein said interconnect structure electrically processes said data from more than one of said input ports to more than one of said output ports of said semiconductor substrate.

11. A computer system comprising first and second computers in communication with one another, each including the semiconductor integrated circuit device of claim 1; wherein said first computer and said second computer define a highly pipelined, computer communication system operating asynchronously from one another.

12. A digital device on or within a semiconductor chip, which comprises:
   (A) a plurality of storage cells for storing said digital signals therein;
   (B) a plurality of functional cells for performing functional operations on said digital signals; and
   (C) an interconnect matrix having a plurality of multibit input leads from at least one of a plurality of input ports connected to receive multibit inputs from one or more of said storage or functional cells, and having a plurality of multibit output leads to at least one of a plurality of output ports connected to send signals to one or more other of said storage or functional cells, wherein said interconnect matrix further includes at least one pair of multiplexors that coordinately processes the multibit inputs from one of said input ports.

13. A computer circuit which comprises a semiconductor integrated circuit device including an interconnect structure for electrically processing data from at least one of a plurality of input ports to at least one of a plurality of output ports in a semiconductor substrate having contact areas disposed in a predetermined spaced relation, said interconnect structure comprising input port leads, multiplexors, and output port leads, wherein said multiplexors coordinately process multibit inputs from an input port and wherein said input leads from each of said input ports are co-located and physically laid out adjacent to one another in said substrate.

14. A computer circuit which comprises a digital device including:
(A) a plurality of storage cells for storing digital signals therein;
(B) a plurality of functional cells for performing functional operations on said digital signals; and
(C) an interconnect matrix having a plurality of multibit input leads from at least one of a plurality of input ports connected to receive multibit inputs from one or more of said storage or functional cells, and having a plurality of multibit output leads to at least one of a plurality of output ports connected to send said digital signals to another of said storage or functional cells, wherein said interconnect matrix further includes at least one pair of multiplexors that coordinately process the multibit inputs from an input port.

15. A computer system comprising two or more computers in communication with one another each computer including a digital device comprised of:
(A) a plurality of storage cells for storing digital signals therein;
(B) a plurality of functional cells for performing functional operations on said digital signals; and
(C) an interconnect matrix having a plurality of multibit input leads from at least one of a plurality of input ports connected to receive multibit inputs from one or more of said storage or functional cells, and having a plurality of multibit output leads to at least one of a plurality of output ports connected to send said digital signals to another of said storage or functional cells, wherein said interconnect matrix further includes at least one pair of multiplexors, each of which coordinately processes the multibit inputs of two input ports.

* * * * *